UNITED STATES PATENT OFFICE.

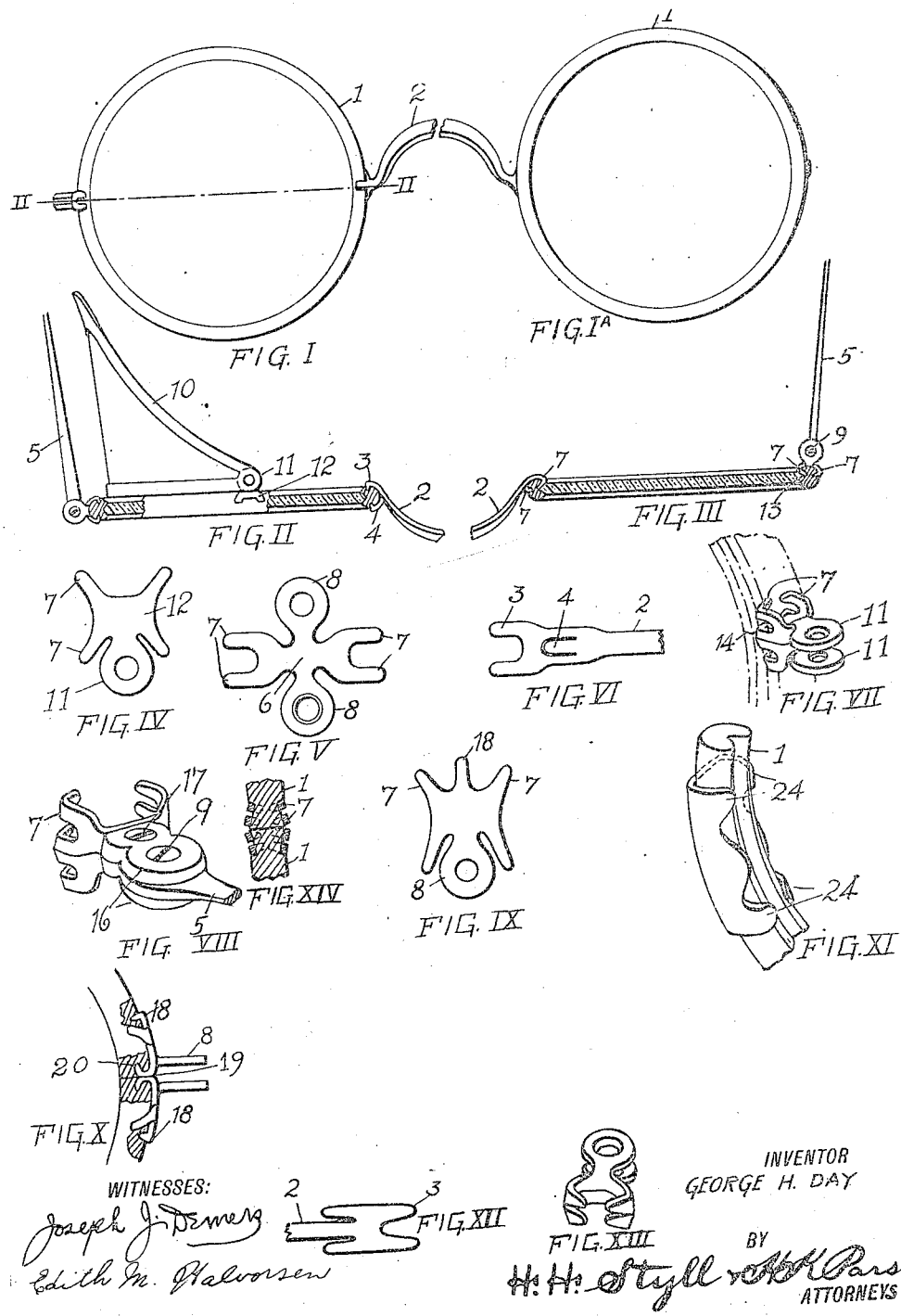

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION.

OPHTHALMIC MOUNTING.

1,145,058.  
Specification of Letters Patent.  
Patented July 6, 1915.

Application filed January 27, 1915. Serial No. 4,590.

*To all whom it may concern:*

Be it known that I, GEORGE H. DAY, a citizen of the United States, residing at Southbridge, in the county of Worcester and State of Massachusetts, have invented certain new and useful Improvements in Ophthalmic Mountings, of which the following is a specification.

This invention relates to improvements in ophthalmic mountings, and has particular reference to an improved manner of connecting metallic parts to shell, xylonite or other composition frames or eye wires.

One of the leading objects of the present invention is the provision of an improved strong, durable and efficient manner of connecting metallic fittings to composition frames.

A further object of the invention is the provision of an improved method of construction which will simplify the formation of the composition or non-metallic portion of the mounting, and which will insure most secure connection between said portion and the other fitting, and in such manner that the connection will serve to reinforce and strengthen rather than weaken the non-metallic portion of the mounting.

A further object of the invention is the provision of a structure of this nature which will obviate the necessity for unsightly reinforcement and enlargement on the non-metallic portion of the frame to receive the metallic fitting.

Other objects and advantages of my improved construction should be readily apparent by reference to the following specification taken in connection with the accompanying drawings forming a part thereof, and it will be understood that I may make any modifications in the specific details of construction shown and described within the scope of the appended claims without departing from or exceeding the spirit of this invention.

Figure I represents a front view of one form of my invention embodying non-metallic eye frames and metallic bridge and end piece members. Fig. I^A is a view similar to Fig. I of a slightly modified form of mounting. Fig. II represents a sectional view on the line II—II of Fig. I. Fig. III represents a view similar to Fig. II of a modified form of construction. Fig. IV represents a plan view of one form of blank. Fig. V represents a plan view of another form thereof. Fig. VI represents a detailed view of the end of one of the bridge members. Fig. VII represents a perspective view illustrating a modified form of end piece in which the eye frame is split. Fig. VIII represents another form of this construction. Fig. IX represents a plan view of an end piece blank, and Fig. X represents a view of the construction shown in Fig. IX applied to a mounting. Fig. XI represents a fragmentary perspective view illustrating another form of clip or clamp for engaging the zylo rim. Fig. XII represents a fragmentary view illustrating a possible variance of the bridge end shown in Fig. VI. Fig. XIII represents a perspective view of a slightly modified form of the construction shown in Fig. VII. Fig. XIV represents a sectional view of the frame with device shown in Fig. VIII applied thereto.

In the drawings, in which similar characters of reference are employed to denote corresponding parts throughout the several views, the numeral 1 designates the eye frame, which may be formed of xyloware, shell or any other suitable non-metallic material, preferably a material light in weight and ornamental in appearance. Connecting the frame members 1 is a bridge 2, which may be either formed integral with the frame 1 and of the same material, or may be a separate metallic or non-metallic member, and may be attached to the frame 1 in any desired manner, different methods of attachment having been illustrated in different figures of the drawings.

In that form of construction particularly illustrated in Fig. II, I have shown the bridge 2 as a metallic member having its ends formed substantially in the manner illustrated in Fig. VI. That is to say, the bridge itself terminates in the pair of furcations 3, while the central portion thereof adjacent the end has stamped therefrom the tongue 4 adapted to be bent outwardly into the position shown in Fig. II. In this form of construction the tongues or furcations 3 and tongue 4 are suitably bent and clamped or forced into the material of the frame 1 to securely fasten the bridge 2 to said frame, while the fitting of the tongue and adjacent portion of the bridge against and around the frame serves as a reinforcing brace at that point, in place of weakening the frame, as would be the case were the frame specially drilled, formed with recesses or the like. A similar method to that just described is employed for securing in position the end piece which carries the temple 5, the blank of this particular end piece being shown in Fig. V, and comprising the body portion 6 having at each end the tongues 7, and having extending from the sides thereof the ears 8 adapted to be bent into parallel relation to receive the pivot 9 for the temple 5. It will thus be seen that by bending and curving of the body portion 6 to fit securely around the frame 1 and then clamping or forcing the tongues 7 into biting engagement with the frame 1, the end piece is securely retained in position, occupies a minimum amount of space, serves to reinforce the frame rather than to weaken the same as is the case with ordinary types of construction, and at the same time securely hold the temple in an inconspicuous but satisfactory position. In the event that this form of mounting is desired for use to protect the eye from wind, dust or the like, a guard 10 may be employed, hinged to the ears 11 of the clamping devices 12, particularly illustrated in Fig. IV, and similar in all essential respects to the end piece blank just described, with the exception that it is preferably provided with but a single ear 11 in place of the pair of ears 8, a single ear in this instance being sufficient to form a pivot attachment for the shield 10.

In Figs. I$^A$ and III, I have shown a slightly modified construction, in which the parts are even less conspicuous than that form just described. That is to say, in place of the tongue 4 coming on the front of the frame 1, as shown in Fig. II, in Fig. III this tongue extends directly inwardly at about the center of the frame, thus leaving no metal exposed on the front portion of the frame, while the tongues 7 curve around the back and fit into the groove 13 for receiving the lens. The end piece is also similarly attached so that none of the metal of the end piece shows when looking at the mounting from the front. This forms an extremely neat looking and consequently ornamental and desirable construction.

In Fig. VII, I have shown a slight modification adapted for use when it is desired to have the rim 1 split to facilitate the insertion of a lens in place of having the lens sprung thereinto when the frame has been suitably softened, as is necessary in that form of invention just described. In this form of construction the frame or eye portion 1 is split, as at 14 and one half of the end piece is carried by each of the abutting ends. The blank from which each of these halves is formed is, therefore, quite similar to the blank shown in Fig. IV, in that it comprises a body portion fitting around the frame 1 with prongs or tongues clampingly engaging the frame, and an outwardly extending ear 11. The two body portions of the clip abut each other as the frame ends are brought together, and serve to hold the two ears 11 sufficiently spaced to permit of free swinging of the temple therebetween, a rivet, screw or the like, being passed through the apertures in the ears and serving at once as a pivot for the temple and also to secure the ears together and thus fasten the ends of the frame and retain the lens in position therewithin.

In Fig. VIII, I have shown a different form of construction embodying the same general principle. In this form, however, I employ simply the two clips 15, each having secured thereto, as by soldering, or riveting, the regular end piece member 16, the two members 16 being secured together by a screw 17, while a second screw 9 engaged in the member 16 forms the pivot for the temple 5. This is, of course, a construction adapted to stand heavier strain than the form shown in Fig. VII, and one in which the parts may be more readily separated for removal and replacement of lenses, as may be desired.

In Figs. IX and X is illustrated another modified form of end piece, which may be used either with a double screw arrangement, as shown in Fig. VIII, or with a single screw, the single screw form being particularly illustrated. This form comprises the body portion 6 having the tongues 7 and in addition having at the opposite end from that on which the ear 8 is disposed, the tongue 18 adapted to bite centrally into the frame 1. This tongue, as indicated in Fig. X forms a species of hook most securely gripping the frame to insure correct bringing together of the ends of the frame as the end piece is tightened, and prevent any possibility of slipping and loosening of the parts. In this form to hold the ears 8 in desired correctly spaced relation the tongues 7 adjacent the ear 8 are so bent as to extend downwardly forming the spacing members 19, and are then reversely bent inward to strike into the end of the frame, the frame being preferably slightly recessed as at 20, so that the ends of the frame may come tightly together and at the same time space be provided to accommodate the tongues 7.

Fig. XI represents a slightly more ornamental form of construction, being shown as used upon an eyeglass in place of a spectacle, it being understood, however, that this form may be interchangeably employed with those types previously illustrated, and that any of the forms of the invention here shown and described are equally applicable for use on either spectacle or eyeglass construction. In this form the clip member is illustrated as having a fluted edge providing a plurality of short tongues 24 which may be suitably crimped or clamped inward into tight engagement with the frame or rim 1.

From the foregoing description taken in connection with the accompanying drawing, the construction and generic underlying principle of my invention should be readily apparent, and it will be seen that I have provided a construction simple and inexpensive of manufacture, by which a metallic fitting may be readily secured to a non-metallic frame, which will occupy minimum space, be inconspicuous and yet securely and firmly hold the parts.

I claim:

1. The combination with a non-metallic lens frame, of a fitting having a portion embracing the frame and having tongues pressed into biting engagement therewith, substantially as described.

2. The combination with a non-metallic frame, said frame having its peripheral outline corresponding in shape to that of the lens to be mounted therewithin, of a metallic fitting having a portion fitting around the frame and longitudinally curved to fit the peripheral curvature of the frame, said fitting having terminal portions biting into the material of the frame and disposed out of the visual field of the lens.

3. A blank for a device of the character described, comprising a body portion having a prong formed on each corner thereof, said body portion being adapted to be longitudinally and transversely curved to fit a frame, and an ear integral with the body portion and extending laterally from one edge thereof intermediate the prongs, said ear being pierced for attachment, substantially as illustrated.

4. The combination with a non-metallic rim shaped to receive a lens therewithin, of a metallic fitting having its inner face longitudinally and transversely curved to fit the corresponding curvatures of the frame, said fitting having portions thereof pressed into biting engagement with and slightly embedded in the frame, whereby the parts are securely united without the use of adhesives or separate fastening devices, substantially as described.

5. The combination with a non-metallic ring having its inner face grooved to receive a lens, of a plurality of metallic fittings having portions embracing the ring at different points, each of said fittings having prongs pressed to bite into the material of the ring to securely retain the fitting in desired position thereon, and each of said fittings having an ear integral with one side thereof, said ear being bent to lie at right angles to the plane of the ring, and a securing or protecting device carried by each of said ears, substantially as described.

6. The combination with a bridge member, of a frame of non-metallic material disposed at each end of the bridge, said frame being of uniform cross section, and metallic fittings mounted upon said frame, each of said fittings comprising a main central body portion having an attaching device projecting therefrom, and terminal inwardly deflected gripping portions, said fittings being applied to the frame with sufficient pressure to cause the entire fitting to become slightly embedded in the frame and the gripping portions to bite into the material of the frame to securely retain the fitting in position, substantially as described.

In testimony whereof I affix my signature in presence of two witnesses.

GEORGE H. DAY.

Witnesses:
 H. K. PARSONS,
 E. M. HALVORSEN.